United States Patent
Yoo et al.

(10) Patent No.: US 7,366,396 B2
(45) Date of Patent: Apr. 29, 2008

(54) METHOD AND APPARATUS OF RECORDING/REPRODUCING MULTI-CHANNEL STREAM

(75) Inventors: Jea Yong Yoo, Seoul (KR); Kang Soo Seo, Kyunggi-do (KR); Byung Jin Kim, Kyunggi-do (KR); Soung Hyun Um, Kyunggi-do (KR)

(73) Assignee: LG Electronics Inc., Seoul (KR)

( * ) Notice: Subject to any disclaimer, the term of this patent is extended or adjusted under 35 U.S.C. 154(b) by 1192 days.

(21) Appl. No.: 10/363,878

(22) PCT Filed: Jul. 6, 2002

(86) PCT No.: PCT/KR02/01284

§ 371 (c)(1),
(2), (4) Date: Mar. 6, 2003

(87) PCT Pub. No.: WO03/005362

PCT Pub. Date: Jan. 16, 2003

(65) Prior Publication Data

US 2004/0005142 A1  Jan. 8, 2004

(51) Int. Cl.
*H04N 9/00* (2006.01)
*H04N 11/00* (2006.01)
*H04N 5/76* (2006.01)
*H04N 7/00* (2006.01)

(52) U.S. Cl. .............................. 386/1; 386/46
(58) Field of Classification Search .................. 386/1, 386/45–46, 83, 111, 125–126, 95–96
See application file for complete search history.

(56) References Cited

U.S. PATENT DOCUMENTS

| | | | |
|---|---|---|---|
| 6,353,613 B1 | 3/2002 | Kubota et al. | |
| 6,901,078 B2 * | 5/2005 | Morris | 370/466 |
| 7,124,303 B2 * | 10/2006 | Candelore et al. | 713/193 |
| 2003/0133509 A1 | 7/2003 | Yanagihara et al. | |

FOREIGN PATENT DOCUMENTS

| | | |
|---|---|---|
| CN | 1237852 | 12/1999 |
| EP | 0917355 A1 | 5/1999 |
| EP | 0940983 A1 | 9/1999 |
| EP | 0873022 A3 | 10/1999 |
| EP | 1081885 A1 | 3/2001 |
| JP | 10051737 | 2/1998 |
| JP | 2000041066 | 2/2000 |
| JP | 2000069437 | 3/2000 |
| WO | WO 9800952 | 1/1998 |

* cited by examiner

*Primary Examiner*—Thai Q. Tran
*Assistant Examiner*—Nigar Chowdhury
(74) *Attorney, Agent, or Firm*—Lee, Hong, Degerman, Kang & Schmadeka

(57) ABSTRACT

The present invention relates to multi-channel stream recording/reproducing method and apparatus. The present multi-channel stream reproducing method checks whether or not reproduced multi-channel stream belongs to same broadcast (RF) channel, and deletes PSI (Program Specific Information) packets included in channel stream excluding one channel stream if it belongs to same RF channel, and makes new PSI packets with reference to PSI packets included in reproduced multi-channel stream to replace them, if not. Furthermore, the present method compensates appropriately PCRs (Program Clock References) included in channel stream excluding one channel stream in case of the latter. The present method enables a digital TV set to present multi-channel stream simultaneously in PIP (Picture-In-Picture) or multi-screen mode with no error in channel selection and presentation (or decoding) time.

16 Claims, 8 Drawing Sheets

FIG. 3a

| b7 | b6 | b5 | b4 | b3 | b2 | b1 | b0 |
|----|----|----|----|----|----|----|----|
| Protect | Reserved | | | | Channel_Ns | | |

Protect --------- 0b : This PG(Prgoram) is not in protected state
1b : This PG is in protected state Channel_Ns ------ Number of channels referred by this PG 000b : 1 CH, 1 Sub-CH
        001b : 1 CH, 2 Sub-CHs
        010b : 2 CHs, 2 Sub-CHs

FIG. 3b

| b7 | b6 | b5 | b4 | b3 | b2 | b1 | b0 |
|----|----|----|----|----|----|----|----|
| Protect | Reserved | | | LK_PG_Nu | | | |

Protect --------- 0b : This PG(Prgoram) is not in protected state
1b : This PG is in protected state LK_PG_Nu ------ Linked Program Number referred by this PG b3 : 0 -> single channel, 1-> multi channels
        b2 : 0 -> same RF channel, 1->different RF channels
        b1b0 : sub-channel number -1

METHOD AND APPARATUS OF RECORDING/REPRODUCING MULTI-CHANNEL STREAM

1. TECHNICAL FIELD

The present invention relates to method and apparatus that records/reproduces a multi-channel stream to/from a recording medium such as a high-density DVD (Digital Versatile Disk).

2. BACKGROUND ART

Owing to technical improvement in the fields of video/audio data compression, digital modulation/demodulation, and so on, a digital television broadcast system broadcasting TV signals in the form of digital data stream is being standardized rapidly.

In the digital television broadcast system, audio/video (A/V) signals to be broadcasted are compressed according to the data compressing rule specified by MPEG 2 (Moving Picture Experts Group) and the compressed A/V data are broadcasted in the form of transport stream (TS), which is also defined in MPEG 2 standard, composed of successive 188-byte-long transport packets (TPs).

The digital TV broadcast system, which will be commercialized soon owing to technical improvement of A/V data compression and transmission, is able to support much higher-quality of video and audio than an analog TV system. Furthermore, it ensures data compatibility with a digital communication device, a digital storage device, etc.

By the way, a new device is being developed to prepare for commercialization of digital TV broadcast system. That is a digital recorder being able to receive TS of digital broadcast programs and to record it on a writable HD-DVD. Such a digital recorder will be widely used as the digital TV broadcast system is commercialized in earnest.

A single physical broadcast channel (called 'RF channel' in general) has about 6 MHz bandwidth which ensures 19.4 Mbps data rate. This data rate can carry a single HD-TV broadcast signal or about four SD-TV signals. Such a logical or virtual channel carrying one SD-TV signal in an RF channel is called sub-channel.

In other words, a single RF channel sometimes includes several digital channels, namely, sub-channels which carry mutually-different broadcast programs. Therefore, a DVD recorder being developed must be able to record/reproduce two or more sub-channels simultaneously at a user's request. In addition, it may be able to record/reproduce two or more sub-channels chosen from different RF channels, respectively.

By the way, an apparatus being able to receive and present digital TV broadcast programs, e.g., a digital TV set can not select a sub-channel and decode a received RF stream until PSI (Program Specific Information) for a digital stream of TV program is received. Moreover, it can keep an exact presentation timing of packets constituting a digital stream after synchronizing an internal clock with PCRs (Program Clock Reference) where respective PCRs carried by the digital stream are received within an allowable interval.

In general, a digital recorder records one channel and reproduces it later. In case that a digital recorder is able to record a plurality of channels, it may reproduce one channel chosen among recorded channels, or reproduce at least two channels simultaneously to present them in a multi-screen, e.g., PIP (Picture-In-Picture) on a digital TV set.

In this multi-channel providing, PSI providing way must be differentiated and PCRs inserted in each channel stream may be compensated depending upon whether all multi channels belong to a single RF channel or not.

3. DISCLOSURE OF INVENTION

It is an object of the present invention to provide a PSI recording method for a plurality of channels that records PSI about a plurality of recorded channels to enable later individual or simultaneous presentation of the recorded channels on a display machine such as a digital TV set.

It is another object of the present invention to provide a PSI transmitting method that transmits PSI recorded along with a plurality of channels to enable later simultaneous presentation thereof on a display machine such as a digital TV set.

It is another object of the present invention to provide a time-information providing method that provides time information of a plurality of recorded channels to enable later simultaneous presentation thereof on a display machine such as a digital TV set.

A method of recording a multi-channel stream in accordance with the present invention is characterized in that it selects a plurality of sub-channels from a tuned broadcast channel, copies PSI packets included in a stream of the tuned broadcast channel into every stream of the selected plural sub-channels if the plurality of sub-channels are in same broadcast channel, records the sub-channels onto a recording medium, and writes information on whether the recorded sub-channels belong to same broadcast channel or not.

A method of reproducing a multi-channel stream in accordance with the present invention is characterized in that it checks whether a plurality of channels reproduced from a recording medium belong to same broadcast channel or not, removes PSI packets included in a channel or channels except one channel if the plural channels belong to same broadcast channel, reconstructs new PSI packets based on information of PSI packets included in respective stream of said channels to replace the existing PSI packets and compensates PCRs adequately if the plural channels belong to different broadcast channels, and multiplexes the stream of the plural channels to output.

The above-characterized multi-channel stream recording/reproducing method can provide a digital display machine set with PCRs and PSI suitable for a plurality of sub-channels chosen from one RF channel or mutually-different RF channels, thereby eliminating errors in channel selection or presentation timing in a digital display machine. Consequently, multi-screen, e.g., PIP displaying is ensured through stable decoding of multi channels.

4. BRIEF DESCRIPTION OF DRAWINGS

FIGS. 3a and 3b show different types of a specific field of program information associated with a recorded stream;

5. MODES FOR CARRYING OUT THE INVENTION

In order that the invention may be fully understood, a preferred embodiment thereof will now be described with reference to the accompanying drawings.

Figure 1:
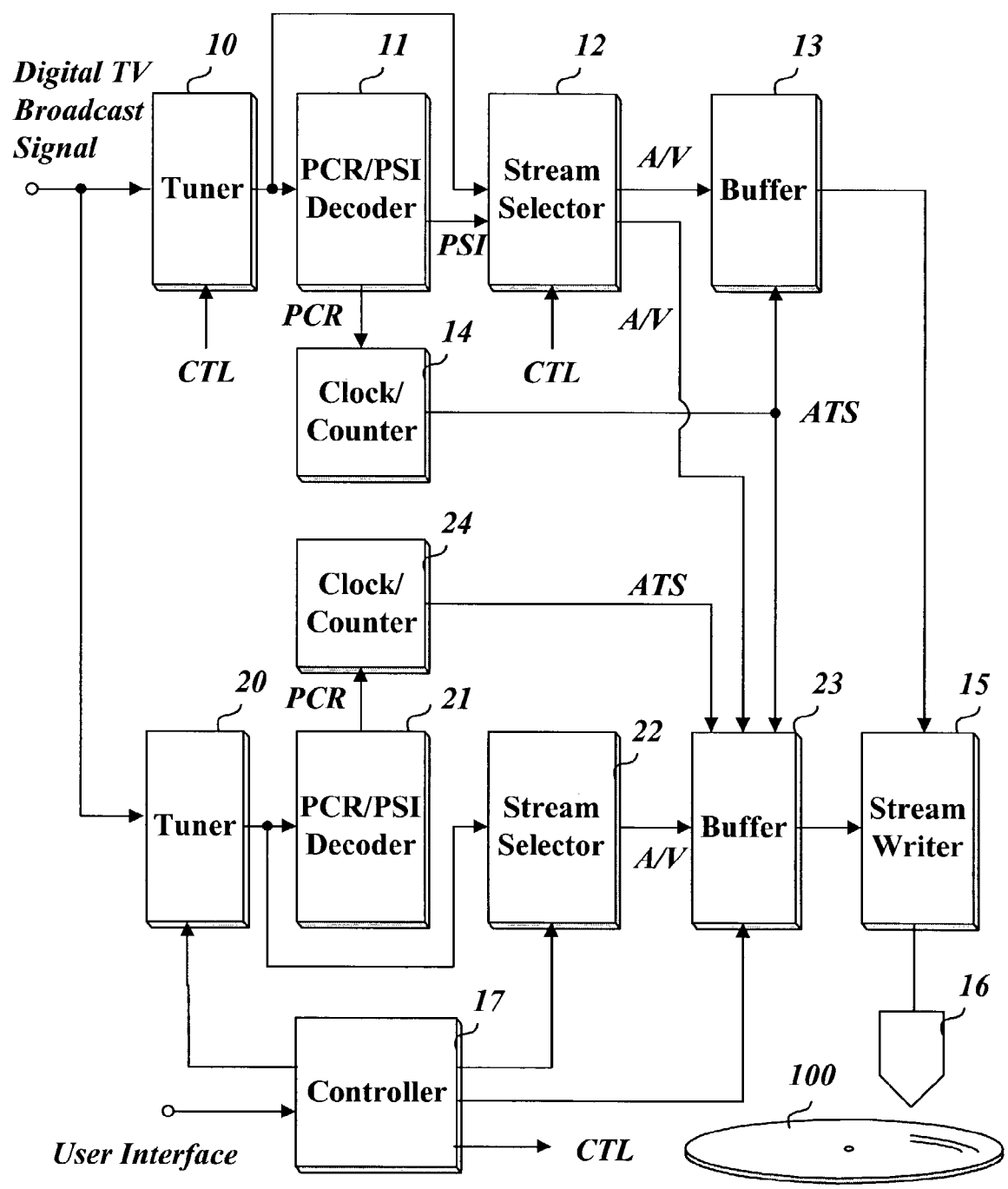
FIG. 1 is a block diagram of a disk device to record a multi-channel stream in accordance with the present invention.

FIG. 1 is a block diagram of a device to record a multi-channel stream in accordance with the present invention. The device of FIG. 1, which may be a digital video recorder (DVR) being able to record onto a writable HD-DVD (High-Density DVD), comprises two tuners 10 and 20 tuning their respective passbands to an RF band of digital broadcast TV signal; two PCR/PSI decoders 11 and 21 extracting packets containing PCR and PSI from a digital stream of RF channels chosen respectively by the two tuners 10 and 20; two stream selectors 12 and 22 selecting a sub-channel respectively from a digital stream outputted through the PCR/PSI decoders 11 and 21; two clock counters 14 and 24 generating individual clocks, synchronizing their clocks with corresponding PCRs extracted by the PCR/PSI decoders 11 and 21, and counting the synchronized clocks; two buffers 13 and 23 storing TPs (Transport Packets) constituting each sub-channel stream while adding counts in the clock counters 14 and 24 to each TP whenever it is arrived; a stream writer 15 writing packets stored in the two buffers 13 and 23 alternately, and creating and writing navigation data for the stream to be written; an optical pickup 16 forming mark/space patterns or pits on a recording medium 100 such as an HD-DVD in accordance with bit patterns of stream and navigation data outputted from the stream writer 15; and a controller 17 conducting overall control operations of all elements for multi-stream record.

Each of the two tuners 10 and 20 passes one digital broadcast TV channel, namely, an RF channel selected by the controller 17, and each of the two PCR/PSI decoders 11 and 21 extracts packets containing a PCR and PSI packets that have segmentized PSI for a broadcast program. At least one PCR has been inserted in a digital stream of an RF channel at longest within an allowable interval, e.g., 100 msec specified by digital TV broadcast standard. The PCR/PSI decoders 11 and 21 send PCRs included in the extracted packets to the clock counters 14 and 24, respectively.

Each of the stream selectors 12 and 22 watches PID (Packet ID) of every TP constituting a received digital stream of an RF channel, and outputs only TPs of which PID is corresponding to each sub-channel chosen by the controller 17.

Each of the two clock counters 14 and 24 synchronizes its own clock with successively-received PCRs, keeps counting the synchronized clock, and provides a clock count for each of the buffers 13 and 23 as a PAT (Packet Arrival Time).

Each of the buffers 13 and 23 reads a count of the clock counter 14 or 24 whenever a TP is stored and adds the read count to the stored TP as a PAT. Thusly-stored TPs with PAT are retrieved in a predetermined data unit alternately from the buffers 13 and 23 by the stream writer 15 and then applied to the optical pickup 16 to be written on the HD-DVD 100. The stream writer 15 also creates and writes navigation data for the written stream during or after record of the stored TPs in the buffers 13 and 23.

Through the above-explained process, two sub-channels chosen respectively from different RF channels are recorded on the HD-DVD 100.

Two sub-channels may be chosen from a single RF channel. In this case, the first stream selector 12 selects not one but two sub-channels. One of the selected two sub-channels is transmitted into the second buffer 23 that uses a count of not the second clock counter 24 but the first clock counter 14 to add PAT to each stored TP. Thusly-stored TPs of two sub-channels of same RF channel are retrieved alternately from the buffers 13 and 23 by the stream writer 15 and then written on the HD-DVD 100, in the same manner explained above.

The briefly-described method of recording a plurality of sub-channels chosen from a single or multi RF channels onto a recording medium is explained in detail below.

Figure 2:
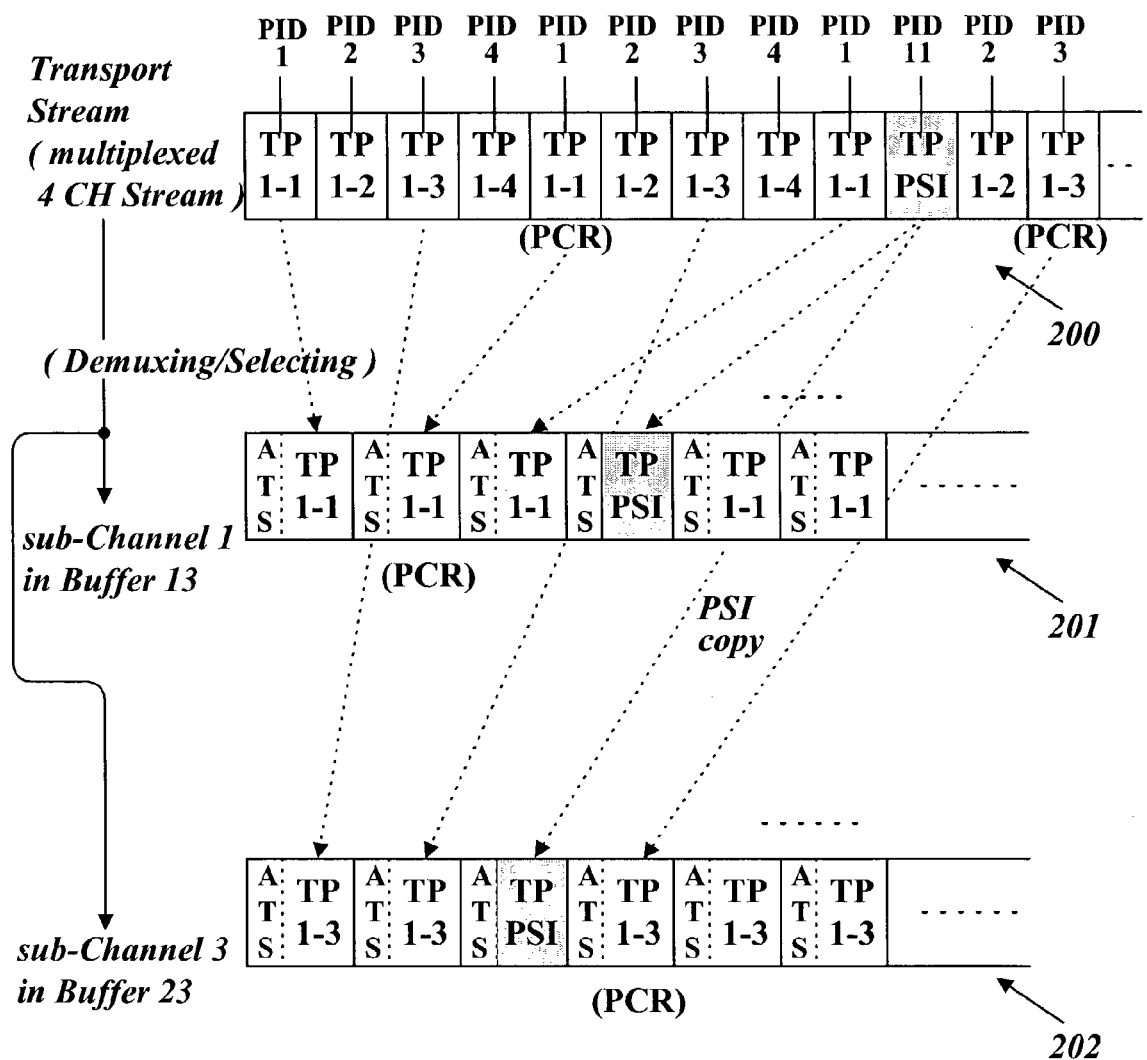
FIG. 2 illustrates a schematic process to select two sub-channels from a single RF (broadcast) channel to record onto a recording medium.

FIG. 2 illustrates a schematic process to select two sub-channels from a single RF channel to record them onto a recording medium. In the example of FIG. 2, the sub-channels CH1 and CH3 are selected from a single RF channel tuned by the first tuner 10 containing four sub-channels of SD quality according to a viewer's selection.

The two sub-channels selected by the first stream selector 12 are stored separately into the first 13 and the second buffer 23. At this time, the first stream selector 12 inserts PSI packets extracted by the first PCR/PSI decoder 11 into one sub-channel and copies those packets into the other sub-channel to make both sub-channels stored in the two buffers 13 and 23 have same PSI packets.

Both of the buffers 13 and 23 read a clock count of the first clock counter 14 and add to each TP of each sub-channel when it is stored. The separately-stored stream 201 and 202 of two sub-channels are alternately retrieved in a predetermined data unit by the stream writer 15 and then written onto the HD-DVD 100.

The stream writer 15 writes the two sub-channels in a single stream object, which is a management unit, or in two different stream objects and creates and records navigation data for each stream object.

According to the standard of a high-density recording medium, a single piece of PGI (ProGram Information) is associated with a single stream object. For preparing the case that a plurality of sub-channels are recorded in a single stream object, the program-type field 'PG_TY', one of fields of PGI associated with the stream object, has a 3-bit sub-field 'Channel_Ns' indicative of sub-channel recorded type, as shown in FIG. 3a.

This sub-field 'Channel_Ns' is '000' when one sub-channel stream is recorded in a single associated stream object, '001' when two sub-channels from same RF channel are recorded, and '010' when two sub-channels from different two RF channels are recorded.

Thus, '001' is written in the sub-field 'Channel_Ns' for the multi-channel stream recording example of FIG. 2.

If each sub-channel is recorded in a single stream object so that plural pieces. of PGI are created, the program-type field 'PG_TY' may have the format of FIG. 3b. The sub-field of linked program number 'LK_PG_Nu' given in FIG. 3b is 4-bit long. This sub-field is '0XXX' when a single channel is recorded. b3 and b2 are '1' and '0' respectively, and a value of 'the other channel number-1' is written in bits of b1b0 when two sub-channels belonging to same RF channel are recorded simultaneously. b3b2 is '11' and b1b0 have a value of 'the other channel number −1' when two sub-channels belonging to different RF channels are recorded simultaneously.

Thus, in case of the multi-channel stream recording example of FIG. 2, '1010' is written in the sub-field 'LK_PG_Nu' of PGI associated with a stream object in which the sub-channel CH1 has been written, and '1000' is written in that field of PGI associated with another stream object in which the sub-channel CH3 has been written.

Those sub-fields 'Channel_Ns' and 'LK_PG_Nu' can be allocated in another navigation data, e.g., cell information instead of PGI.

Figure 4:
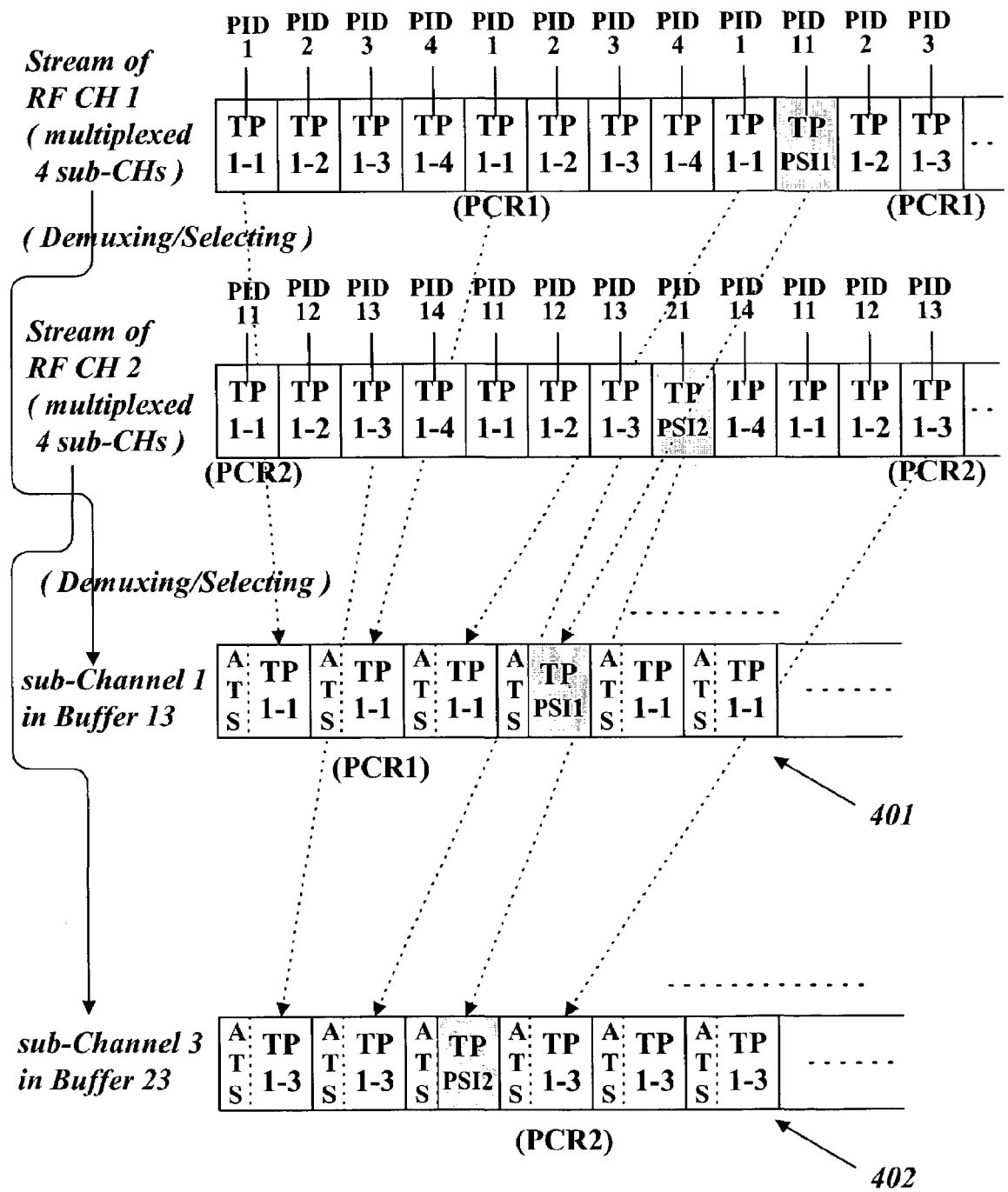
FIG. 4 illustrates a schematic process to select two sub-channels from two different RF channels to record onto a recording medium.

FIG. 4 illustrates a schematic process to select two sub-channels from two different RF channels to record them onto a recording medium. In the example of FIG. 4, the sub-channel CH1 of SD quality is selected by the first stream selector 12 from a RF channel tuned by the first tuner 10, and the sub-channel CH3 of SD quality is selected by the second stream selector 22 from another RF channel tuned by the second tuner 20.

In case that two selected sub-channels belonging to different RF channels are recorded as above, the two stream selectors 12 and 22 insert PSI packets 'PSI1' and 'PSI2', which are extracted from different RF channels respectively by the PSI/PCR decoders 11 and 21, in the selected sub-channels respectively and then send the PSI packet-inserted sub-channels to the buffers 13 and 23. The first buffer 13 reads a 4-byte current count of the first clock counter 14 and adds the read count to the received TP of the sub-channel CH1 as PAT thereof. The second buffer 23 reads a 4-byte current count of the second clock counter 24 to add to the received TP of the sub-channel CH3 from the second stream selector 22.

The sub-channels CH1 401 and CH3 402 stored respectively in the first 13 and the second buffer 23 are recorded in a single stream object or in two stream objects separately on the HD-DVD 100 as explained above. Navigation data related with a created stream object or stream objects are also created by the stream writer 15 and then recorded onto the recording medium 100.

If the program-type field of FIG. 3a is adopted for the recording example of FIG. 4, '010' is written in the sub-field 'Channel_Ns', and if the program-type field of FIG. 3b is used, '1110' is written in the sub-field 'LK_PG_Nu' of PGI for the stream 401 of sub-channel CH1.

A reproducing method and apparatus of reproducing a multi-channel stream recorded as above is explained below.

Figure 5:
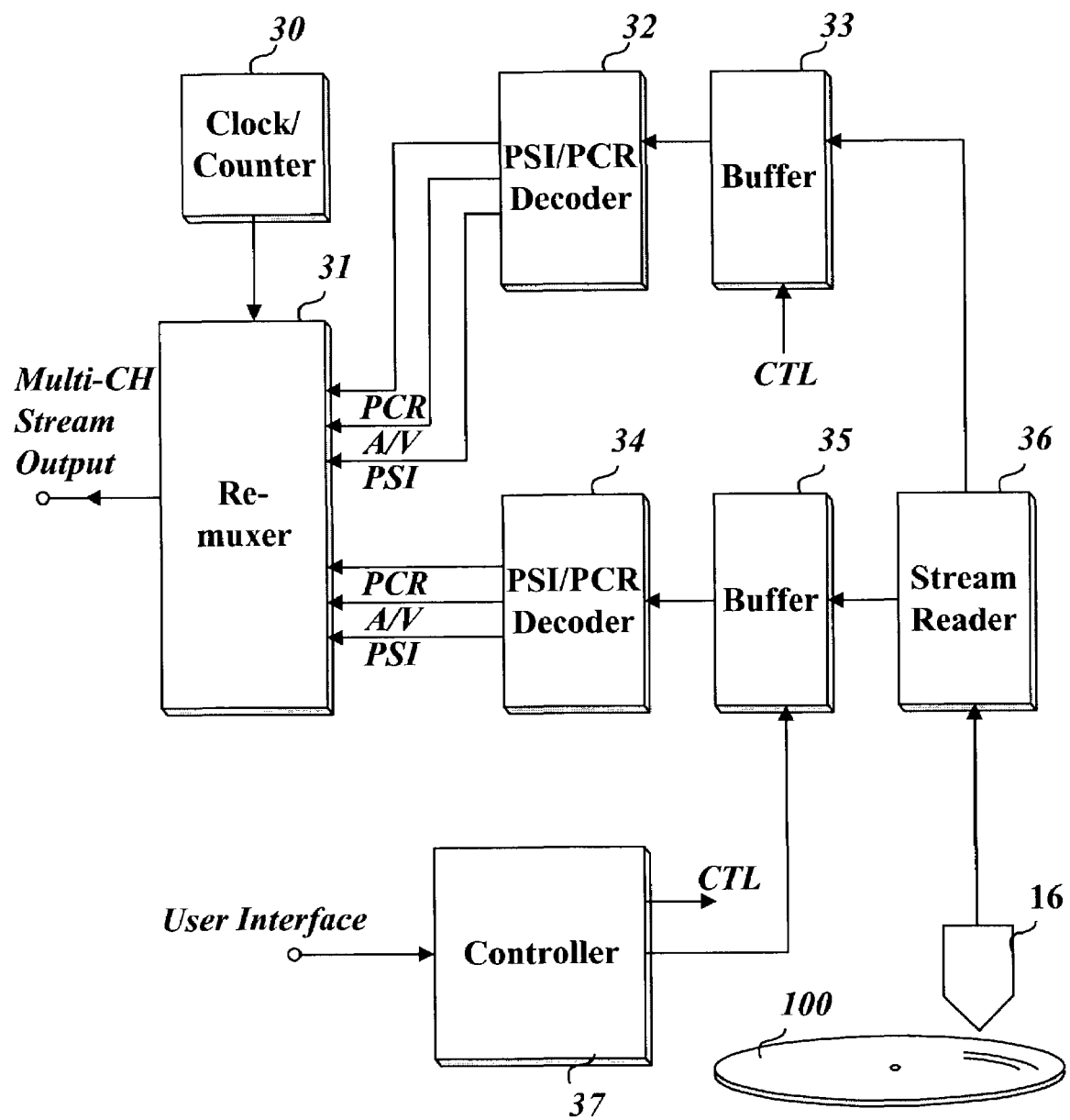
FIG. 5 is a block diagram of a disk device to reproduce a recorded multi-channel stream in accordance with the present invention.

FIG. 5 is a block diagram of a disk device to reproduce a recorded multi-channel stream in accordance with the present invention. The device of FIG. 5, which may be a digital video recorder (DVR), comprises a stream reader 36 reading recorded signals, processing the read signals to restore original data stream, and separating the restored data stream into individual sub-channel stream; two buffers 33 and 35 storing the separated sub-channel stream; two PCR/PSI decoders 32 and 34 separating each sub-channel stream into PCR information, PSI packets, and real data, namely, A/V (Audio/Video) packets; a clock counter 30 counting an internal clock continuously; a re-multiplexer 31 constructing a multi-channel stream newly, if needed, from the sub-channel stream outputted respectively through the two PCR/PSI decoders 32 and 34 based on how the sub-channels are related each other; and a controller 37 controlling the stream constructing operation of the re-multiplexer 31 after checking how the reproduced sub-channels are related each other.

A multi-channel stream reproducing method conducted by the device of FIG. 5 is explained in detail below.

The stream reader 26 reads a multi-channel stream that is recorded in a single stream object or separately in two stream objects. If it is read from a single stream object, the stream reader 26 reads recorded data sequentially and separates into respective sub-channels based on PID of each TP, and if from two stream objects, the stream reader 26 reads two stream objects alternately and stores alternately-read data in the corresponding buffer 33 or 35.

The stream reader 26 also checks the program-type field of PGI associated with a single or plural stream objects, and notifies the controller 37 of a value of the sub-field 'Channel_Ns' shown in FIG. 3a or the sub-field 'LK_PG_Nu' shown in FIG. 3b. Then, the controller 37 knows, based on the notified information, how the read-out sub-channels are related each other and controls the re-multiplexer 31 according to the known fact.

Each sub-channel stream stored in the buffers 33 and 35 is separated into PSI packets and A/V packets by the PSI/PCR decoder 32 or 34, and each PCR written in a TP is decoded and then delivered to the re-multiplexer 31. The re-multiplexer 31 processes input of the two sub-channels differently based on the control information from the controller 37.

Figure 6:
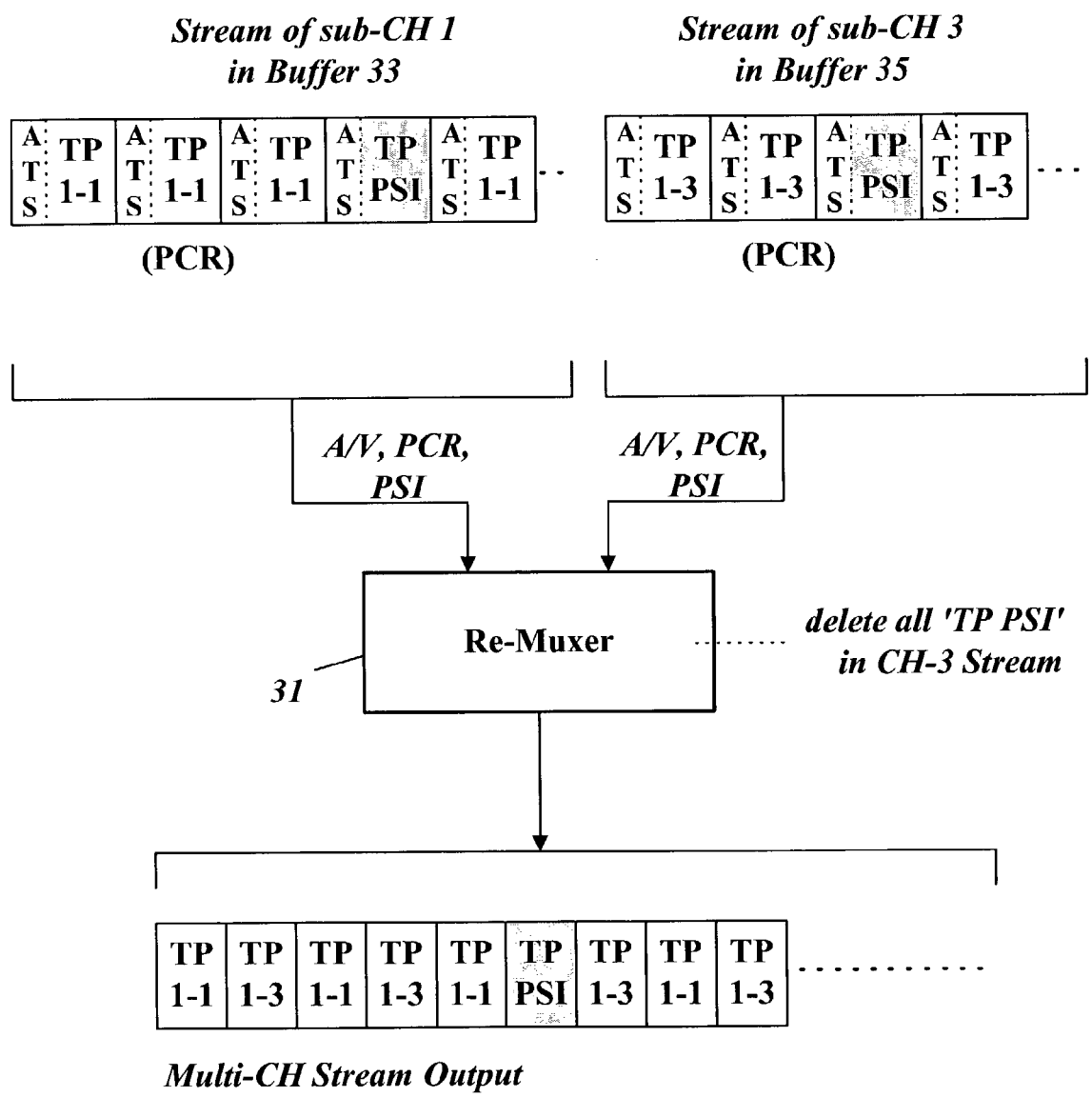
FIG. 6 illustrates a schematic process to reproduce two sub-channels belonging to same RF channel that were recorded by the recording process of FIG. 2.

FIG. 6 illustrates a schematic process to reproduce two sub-channels belonging to same RF channel that were recorded as the exemplary recording process of FIG. 2.

In the example of FIG. 6, the controller 37 knows that the reproduced sub-channels belong to same RF channel based on a fact that the delivered sub-field value from the stream reader 36 is '001' in 'Channel_Ns' or '1000' or '1010' in 'LK_PG_Nu'. Thus, the controller 37 applies a signal indicative of 'same channel mode' to the re-multiplexer 31.

Then, the re-multiplexer 31 removes PSI packets inserted in one sub-channel stream of the two, e.g., the sub-channel stream from the second PSI/PCR decoder 34 because the two reproduced sub-channels have same PSI packets. One sub-channel stream and the other sub-channel stream from which PSI packets are removed are stored temporarily in an internal buffer of the re-multiplexer 31. TPs of the two sub-channels stored together in the internal buffer are multiplexed to be transmitted sequentially in order of PAT thereof. Namely, a TP with preceding added PAT is transmitted a head of a TP with later PAT regardless of sub-channel thereof.

After transmission of the first TP, the next TP is transmitted the moment the count difference between a current count of the clock counter 30 and a previous count when the first TP was transmitted is equal to the time difference between PAT of the next TP and the PAT of the first TP already transmitted. Each transmitting time of next successive TPs is determined in the same manner.

A displaying machine such as a digital TV set receiving the stream of two sub-channels transmitted as above can select and decode it based on PSI information to present in multi-screen or in PIP screen.

Figure 7:
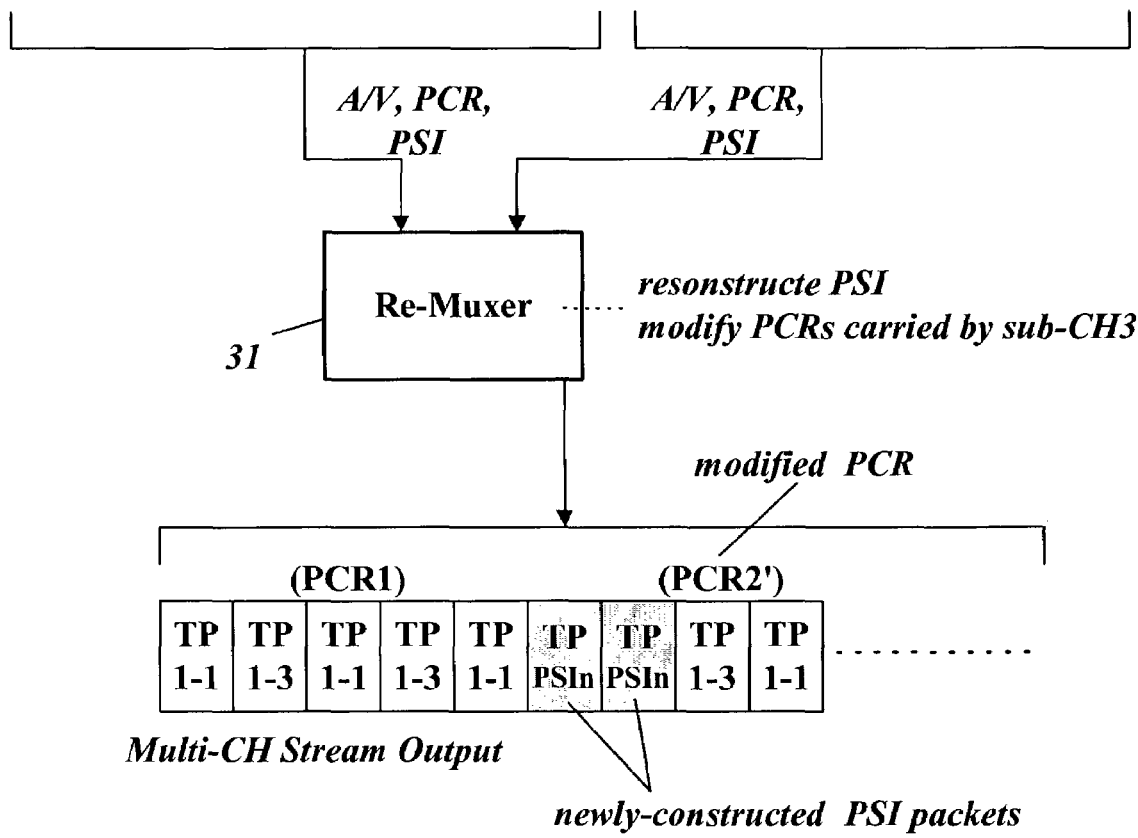
FIG. 7 illustrates a schematic process to reproduce two sub-channels belonging to different RF channels that were recorded by the recording process of FIG. 4.

FIG. 7 illustrates a schematic process to reproduce two sub-channels belonging to different RF channels that were recorded as the exemplary recording process of FIG. 4.

In the example of FIG. 7, the controller 37 knows that the reproduced sub-channels belong to mutually-different RF channels based on a fact that the delivered sub-field value from the stream reader 36 is '010' in 'Channel_Ns' or '1100' or '1110' in 'LK_PG_Nu'. Thus, the controller 37 applies a signal indicative of 'different channel mode' to the re-multiplexer 31.

Then, the re-multiplexer 31 examines the PSI packets 'PSI1' and 'PSI2' included respectively in the two sub-channels inputted from the PSI/PCR decoders 32 and 34 to construct new PSI packets 'PSIn' accordingly. The old PSI packets 'PSI1' and 'PSI2' are individually replaced with these new PSI packets 'PSIn'. PSI information carried by the new PSI packets includes PAT (Program Association Table), PMT (Program Map Table), NIT (Network Information Table), and CAT (Conditional Access Table) that are made in view of a virtual single RF channel composed of the sub-channels CH1 and CH3.

And, PCRs are also modified to make a virtual single RF channel out of the two sub-channels having belonged to different RF channels. For the modification of PCRs, the re-multiplexer 31 calculates a PCR offset that is necessary to add to or subtract from PCRs carried by either sub-channel of the two. The PCR offset is equal to a difference between the first PCRs of the two sub-channels.

Figure 8A:
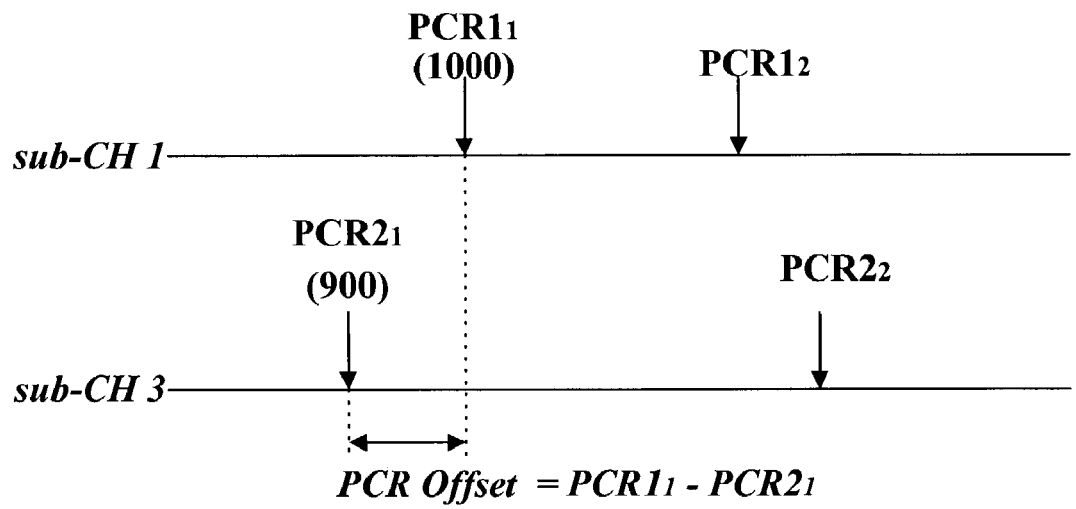
FIGS. 8a to 8c show exemplary manners to compensate PCRs of a reproduced multi-channel stream in accordance with the present invention.

For example, if the first PCR 'PCR31' of the sub-channel CH3 of the second RF channel is '900' and the first PCR 'PCR11' of the sub-channel CH1 of the first RF channel is '1000', as shown in FIG. 8*a*, then the PCR offset is '100'.

Figure 8B:
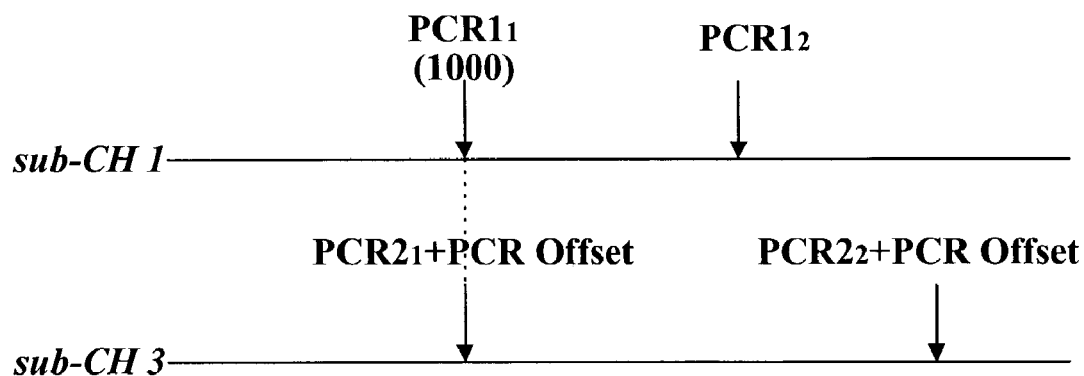
Figure 8C:
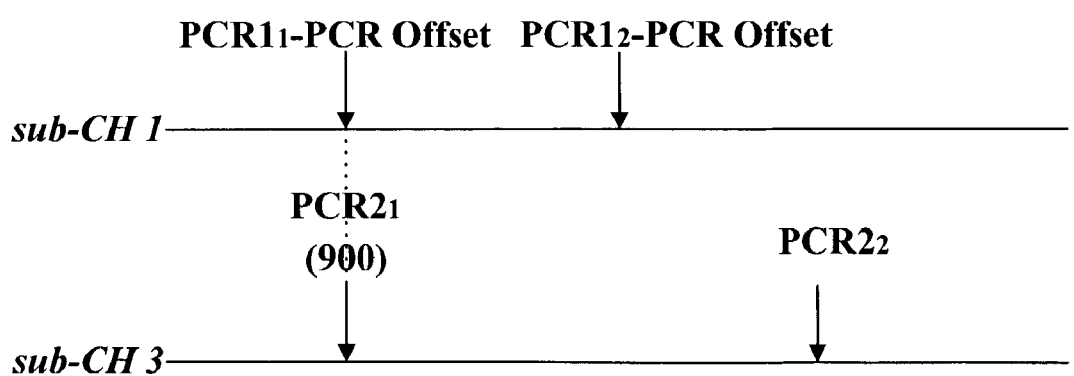

The PCR offset obtained as above is added to each PCR 'PCR3*x*' of one sub-channel stream of which the first PCR is smaller, namely, the sub-channel stream CH3, or is subtracted from each PCR 'PCR1x' of which the first PCR is larger, namely, the sub-channel stream CH1. FIGS. 8*b* and 8*c* show respective cases that the sub-channel CH3 is compensated in its individual PCRs.

Another time information such as PTS (Presentation Time Stamp) and DTS (Decoding Time Stamp) carried by a sub-channel stream whose PCRs are modified is also modified by the PCR offset.

TPs of the two sub-channels reconstructed as above are multiplexed to be transmitted sequentially in order of PAT thereof. The transmitting interval among successive TPs is determined the same as explained before.

A displaying machine such as a digital TV set receiving the multi-channel stream transmitted as above can select and decode it based on PSI information to present in multi-screen or in PIP screen.

In case that two sub-channels that have been recorded during different time zone are reproduced simultaneously, even though they are in same RF channel, the above-explained reproducing method for sub-channels belonging to different RF channels is applied instead of the method for sub-channels belonging to same RF channel.

In other words, PCRs (PTS/DTS as well) of one sub-channel are modified and PSI information is reconstructed before they are provided for a digital TV set, in this case. Furthermore, because their respective recording time zones are different, PATs of one sub-channel stream of which the first PAT is precedent are all added by the difference between the two first PATS. And, transmitting sequence and interval among TPs of the two sub-channels are determined based on the modified PATs of the one sub-channel and the original PAT of the other.

The invention may be embodied in other specific forms without departing from the sprit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The invention claimed is:

1. A method of reproducing a multi-channel stream, comprising the steps of:
   (a) checking whether a plurality of channels reproduced from a recording medium belong to same broadcast channel or not; and
   (b) reconstructing PSI (Program Specific Information) packets based on PSI packets included in every stream of said channels, or multiplexing every stream of the reproduced plural channels to output after removing PSI packets included in a channel or channels except one channel, based on the result of checking step.

2. The method of claim 1, wherein said step (b) removes PSI packets included in a channel or channels except one channel if said plural channels belong to same broadcast channel.

3. The method of claim 1, wherein said step (b) constructs new PSI packets based on information written in PSI packets included in said every stream to replace the PSI packets in each stream with the constructed PSI packets, if said plural channels belong to different broadcast channels.

4. The method of claim 3, wherein said step (b) modifies PCRs (Program Clock References) written in transport packets constituting a stream of one of the plurality of channels, and then multiplexes every stream of the plurality of channels to output.

5. The method of claim 4, wherein said step (b) modifies the PCRs by difference between the first PCRs included in respective stream of the plural channels.

6. The method of claim 4, wherein DTS (Decoding Time Stamp) and PTS (Presentation Time Stamp) included in the channel stream of which PCRs are modified are compensated as much as the PCRs are modified.

7. The method of claim 1, wherein said step (a) checks whether the reproduced plural channels belong to same broadcast channel based on a field value allocated in management information for a stream of the reproduced channel.

8. A method of reproducing a multi-channel stream, comprising the steps of:
   (a) reproducing a plurality of channels from a recording medium; and
   (b) constructing, if said plural channels have been recorded in different time zone, new PSI packets based on information written in PSI packets included in a stream of respective channels to replace the PSI packets in each stream with the constructed PSI packets, and multiplexing the respective stream of the plurality of channels to output.

9. The method of claim 8, wherein said step (b) modifies PCRs (Program Clock References) written in transport packets constituting a stream of one of the plurality of channels, and multiplexes every stream of the plurality of channels to output.

10. An apparatus of reproducing a multi-channel stream, comprising:
   reproducing means reproducing a plurality of channels from a recording medium;
   judging means checking whether the reproduced plural channels belong to same broadcast channel or not; and
   a data processor reconstructing PSI (Program Specific Information) packets included in every stream of said channels, or multiplexing the respective stream of the reproduced plural channels to output after removing PSI packets included in a channel or channels except one channel, based on the result of checking operation of said judging means.

11. The apparatus of claim 10, wherein said data processor modifies PCRs (Program Clock References) written in transport packets constituting a stream of one of the plurality of channels and then multiplexes every stream of the plurality of channels to output, if it is judged by said judging means that said plural channels belong to different broadcast channels.

12. The apparatus of claim 11, wherein said data processor modifies the PCRs by difference between the first PCRs included in respective stream of the plural channels.

13. The apparatus of claim 11, wherein DTS (Decoding Time Stamp) and PTS (Presentation Time Stamp) included in the channel stream of which PCRs are modified are compensated by said data processor as much as the PCRs are modified.

14. The apparatus of claim 10, wherein said judging means judges whether the reproduced plural channels belong to same broadcast channel based on a field value allocated in management information for a stream of the reproduced channel.

15. An apparatus of reproducing a multi-channel stream, comprising:

reproducing means reproducing a plurality of channels from a recording medium; and a data processor, if said plural channels have been recorded in different time zone, constructing new PSI packets based on information written in PSI packets included in every stream of said channels to replace the PSI packets in each stream with the constructed PSI packets, and multiplexing the respective stream of the plurality of channels to output.

16. The apparatus of claim 15, wherein said data processor modifies PCRs (Program Clock References) written in transport packets constituting a stream of one of the plurality, of channels and then multiplexes every stream of the plurality of channels to output.

* * * * *